United States Patent [19]
Haefner et al.

[11] 4,085,615
[45] Apr. 25, 1978

[54] LINEAR FLOWMETER

[75] Inventors: Kenneth B. Haefner, Schenectady; Carl G. Ringwall, Scotia, both of N.Y.

[73] Assignee: General Electric Company, Wilmington, Mass.

[21] Appl. No.: 743,907

[22] Filed: Nov. 22, 1976

[51] Int. Cl.² ............................................. G01F 1/32
[52] U.S. Cl. ................................................ 73/194 B
[58] Field of Search ........................ 73/194 B, 194 C; 137/826, 835, 839, 840

[56] References Cited
U.S. PATENT DOCUMENTS

| | | | |
|---|---|---|---|
| 3,016,066 | 1/1962 | Warren | 137/835 |
| 3,608,573 | 9/1971 | Bahrton | 137/839 |
| 3,802,283 | 4/1974 | Bahrton | 73/194 |
| 3,902,367 | 9/1975 | Grant et al. | 73/194 |

FOREIGN PATENT DOCUMENTS 1,246,861   9/1971   United Kingdom ................ 137/835

*Primary Examiner*—Herbert Goldstein
*Attorney, Agent, or Firm*—I. David Blumenfeld

[57] ABSTRACT

A flowmeter of the fluid oscillator type having a fluid jet which oscillates at a frequency indicative of flow rate. A linear flow rate vs. frequency output characteristic is obtained by use of a fluid accelerating means in the form of a two-dimensional sharp edge orifice. The orifice has an aspect ratio selected to give a constant coefficient of discharge throughout an extended flow range including laminar and turbulent flow conditions.

8 Claims, 9 Drawing Figures

LINEAR FLOWMETER

BACKGROUND OF THE INVENTION

The present invention relates to flowmeters and flow sensors of the no-moving-parts type utilizing a fluid oscillator so arranged that the frequency of oscillation is indicative of the flow rate being measured or indicated.

In flowmeters of the above type, a fluid amplifier is used which has fluid accelerating means for accelerating a jet of fluid into an interaction chamber where a portion of the jet is received by a pair of oppositely disposed fluid receivers in differentially variable amounts depending on the position of the jet. The position of the jet is controlled by opposing pressures exerted thereon laterally through control ports connected to the receivers through negative feedback conduits so that the jet oscillates. It is desirable that such flowmeters have a linear flow vs. frequency characteristic since the oscillation frequency is measured and used as an indication of the flow rate. Heretofore, such linearity has not been completely achieved and this has required external calibrating compensation either in the form of a calibrated bypass around the flowmeter or special compensation interposed in the flowmeter readout system. In the interest of improving accuracy and reducing cost, it is desirable to eliminate such external compensation schemes, particularly in extended range flowmeters operating over a wide range of flow conditions including laminar as well as turbulent flow. Such an extended range flowmeter is disclosed and claimed in a co-pending application of C. G. Ringwall, Ser. No. 738,067, filed Nov. 2, 1976 (Docket 267652EE1910A) which is assigned to the same assignee as the present invention.

Accordingly, it is an object of the invention to provide a flowmeter of the fluid oscillator type having an output characteristic that is essentially linear for a wide range of flow conditions so that external compensation for non-linearity is not required.

A further object of the invention is to provide a flowmeter of the fluid oscillator type having a novel construction of the fluid accelerating means providing a constant discharge coefficient for various flow conditions whereby a linear flow vs. frequency output characteristic of the flowmeter is obtained.

Another object of the invention is to provide a flowmeter of the fluid oscillator type that is insensitive to viscosity changes in the metered fluid.

SUMMARY

Briefly, the fluid oscillator used in the flowmeter utilizes a sharp edge orifice rather than a nozzle for accelerating a jet of fluid into an interaction chamber where it is caused to oscillate by negative feedback forces exerted thereon through control ports. The orifice has a non-circular configuration preferably rectangular with sharp edges on two opposite sides. By proper proportioning of dimensions determining the orifice size; e.g., the height to width ratio, a constant discharge coefficient for the orifice is obtained thereby giving the desired linear output characteristic of the flowmeter. Furthermore, this construction makes the flowmeter insensitive to temperature and resulting viscosity changes in the metered fluid.

For a better understanding of the invention, reference should be made to the following detailed description taken in connection with the accompanying drawings.

DESCRIPTION OF THE ILLUSTRATED EMBODIMENT

Figure 3:
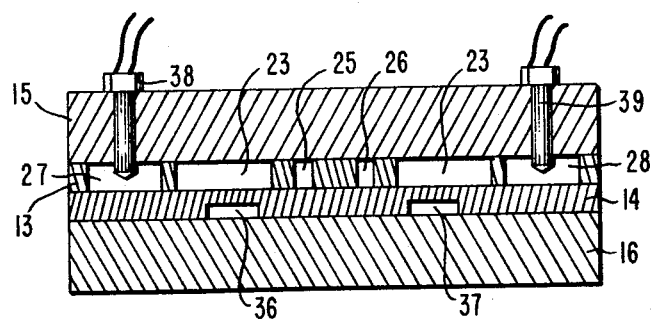
FIG. 3 is a front sectional view of the flowmeter along the section line 3—3 of FIG. 1 looking in the direction of the arrows.

The flowmeter of the present invention is a no-moving-parts type employing a fluid amplifier with negative feedback connections which cause it to function as a fluid oscillator. The oscillation rate is proportional to the flow rate through the oscillator which is the same or proportional to the flow rate to be measured and indicated. The construction of the flowmeter is illustrated in FIGS. 1, 2 and 3 of the drawing to which reference will now be made.

The flowmeter comprises a housing 10 having threaded inlet and outlet connections 11 and 12 adapted to be connected in a fluid line (not shown) conducting a fluid, either liquid or gaseous, the volumetric flow rate of which is to be measured. The housing has internal fluid flow passages to be described formed in any suitable manner which carry the measured fluid between the inlet and outlet connections. In the form illustrated, these fluid passages are formed in and by two adjacent laminations or plates 13 and 14 held in position between top and bottom cover plates 15 and 16. The assembly is held together in any suitable manner as by screws or rivets (not shown). In actual practice, the plates 13 and 14 may conveniently be formed of a stack of relatively thin laminations of suitable material such as stainless steel held together by a diffusion bonding process.

Figure 1:
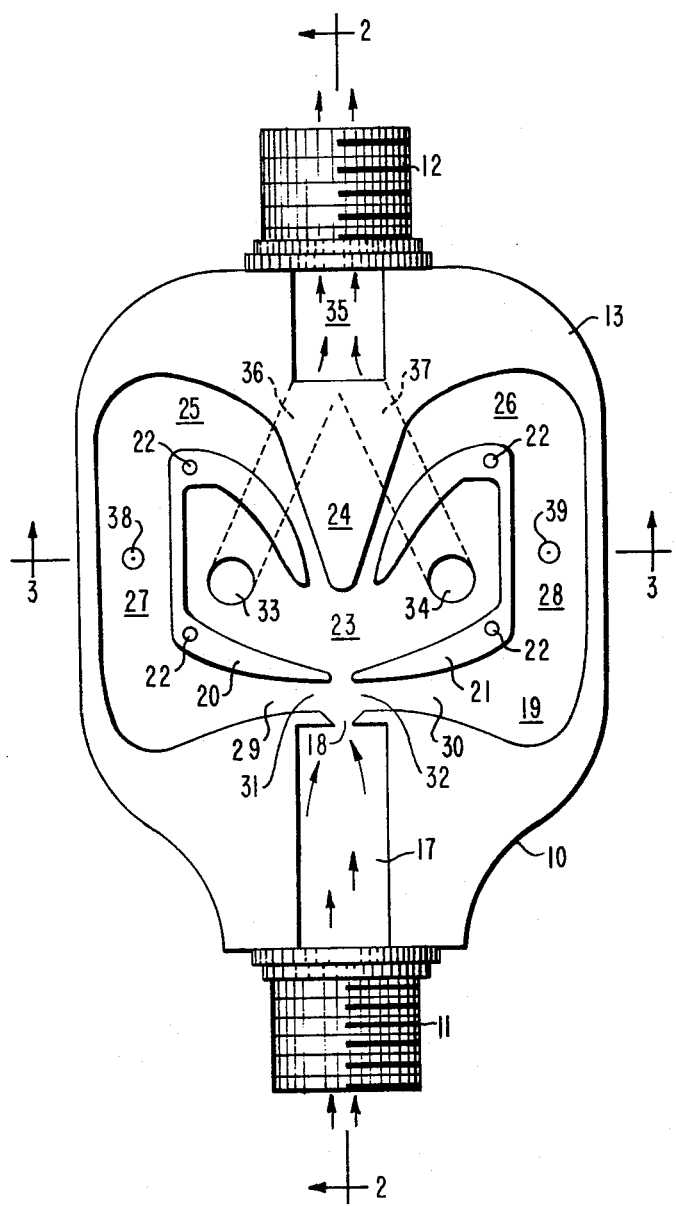
FIG. 1 is a plan view of a flowmeter embodying the invention with the cover plate removed to show the configuration of the flow passages therein.
Figure 2:
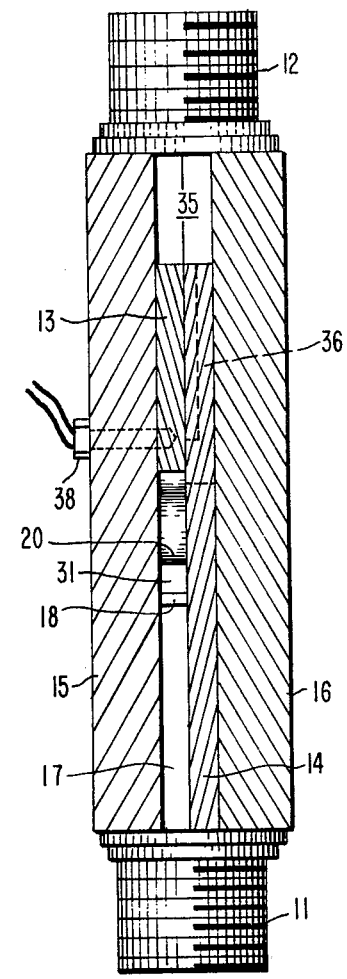
FIG. 2 is a side sectional view taken along the section line 2—2 of FIG. 1 looking in the direction of the arrows.

As best shown in FIG. 1, where the cover plate 15 has been removed, the plate 13 has a cutaway portion forming a plenum chamber 17 communicating at the bottom with the inlet connection 11 and having at the top inwardly projecting portions forming a fluid accelerating orifice 18. The constructional details of the orifice forming an important part of this invention are shown in greater detail in FIGS. 6 and 7 of the drawing to which further reference is made below. The central part of plate 13 has an enlarged opening 19 closed at the bottom by plate 14 and at the top by cover 15 when in the assembled position. Symmetrically mounted within the opening 19 on opposite sides of a center line through orifice 18 are two C-shaped members 20 and 21. These are properly positioned by rivets or stakes passing through holes 22 and extending into plate 14. The inner walls of the members 20 and 21 which face each other form an enclosure 23 termed an interaction chamber into which a fluid jet from orifice 18 passes through the bottom opening between the members. The upper outer walls of members 20 and 21 form, together with a centrally positioned projection 24 depending from plate 13, oppositely disposed diverging passages or fluid receivers 25 and 26 leading from chamber 23. The outer side walls of members 20 and 21 form together with the side walls of opening 19 in plate 13 a pair of negative feedback conduits 27 and 28. The bottom outer walls of members 20 and 21 together with the bottom wall of opening 19 in plate 13 are configured to form converging passages 29 and 30 terminating in fluid openings referred to as control ports 31 and 32. These ports are located on opposite sides of and closely adjacent to the base of the jet issuing from orifice 18 upstream with respect to the interaction chamber.

Fluid entering interaction chamber 23 leaves the chamber through vent openings 33 and 34 placed on opposite sides of the fluid jet. These vents are connected to an exit chamber 35 by passageways 36 and 37 formed by cutting grooves in the bottom of plate 14 as best shown in FIG. 3. Fluid flows from the exit chamber 35 out through outlet coupling 12.

Considering now the fluid flow conditions in the flowmeter assume that a flow to be measured enters the flowmeter through inlet connection 11 and passes through chamber 17 and orifice 18 which produces a jet passing into the interaction chamber 23 the central axis of which is aligned with projection 24. An equally divided part of the flow will enter receivers 25 and 26, pass through feedback conduits 27 and 28 and converging conduits 29 and 30 to rejoin the jet after exiting through control ports 31 and 32. For this condition, assuming it to be steady state, the lateral pressures exerted on the jet by the control ports are equal. If the jet is deflected to the left, more fluid will enter receiver 25 than enters receiver 26 and more fluid exits port 31 than port 32. Thus the pressure exerted on the jet through port 31 is greater than that exerted by port 32 and the jet is deflected to the right. With the jet in the right of center position, more fluid enters receiver 26 than receiver 25 so that port 32 exerts more pressure on the jet than port 31 moving it back again to the left position. In this manner, the jet oscillates laterally and the oscillation frequency is a function of the flow rate through the flowmeter which is the condition desired to be measured.

The oscillation of the jet produces pressure and flow perturbations in the feedback conduits 27 and 28 which can be sensed by any suitable transducer and read out as an indication of volumetric flow rate. The transducer can, for example, be piezoelectric, thermistor, hot wire or reluctance type and measurements may be made in either feedback passage or both.

Figure 4:
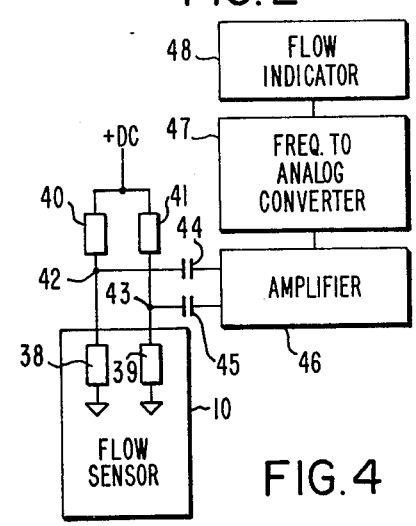
FIG. 4 is a schematic connection diagram showing how the flow signal is produced and displayed.

A thermistor sensor system using two thermistors with their outputs differentially summed is preferred in order to obtain increased gain, improved reliability and decreased sensitivity to D.C. supply current flow changes. As best shown in FIG. 3, two thermistors 38 and 39 of known construction, are mounted to extend through cover plate 15 so that their temperature sensitive lower ends project into the feedback passages 27 and 28. As shown in schematic circuit diagram of FIG. 4 direct current flows through two branches containing dropping resistors 40 and 41 to the heater elements of thermistors 38 and 39. These heater elements are differentially cooled by periodic changes in the pressure and flow conditions in feedback passages 27 and 28 and the resulting resistance changes produces an A.C. voltage across connection points 42 and 43. After passing through D.C. isolating capacitors 44 and 45, the A.C. signal is amplified in amplifier 46. In an analog readout system, the A.C. signal is then fed to a frequency-to-analog converter 47 and read out on a suitable flow indicator 48. Where a counter system is used to indicate flow rate, the A.C. signal may be clipped to form a square wave which is then fed to a pulse counter where the pulses are periodically totaled in a well-known manner.

Figure 5:
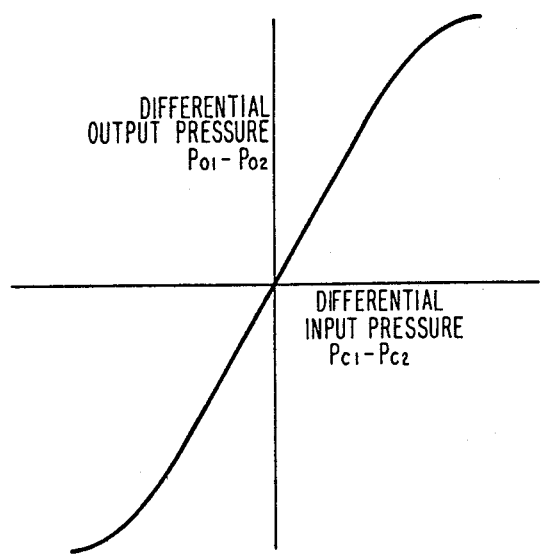
FIG. 5 is a graphical representation illustrating an operating characteristic of the fluid amplifier forming a part of the flowmeter.

Prior no-moving-part flowmeters with limited operating range shown, for example, in U.S. Pat. No. 3,640,133 Adams have utilized bistable fluid amplifiers in which the jet oscillation is the result of a complex interaction of a positive feedback action caused by boundary layer and wall attachment effects and negative feedback action caused by control jets impinging laterally on the fluid jet. The result is a discontinuous flip-flop kind of jet oscillation which is operative only for turbulent flow conditions in the flowmeter thus greatly limiting its operative flow range. The present invention is shown as applied to an extended range flowmeter of the type disclosed and claimed in the above-mentioned co-pending Ringwall application. In this type, the boundary layer and wall attachment effects are eliminated whereby the jet is deflected solely by the differential pressure action of the control ports 31 and 32. This is accomplished by the oscillator construction wherein side walls of the interaction chamber are widely spaced from the fluid jet and cannot, by fluid entrainment, create a reduced pressure on one side of the jet which causes it to lock on a side wall adjacent to the jet. In addition to the spacing of the side walls, it will be noted that the vent openings 33 and 34 on opposite sides of the jet centerline and around which the curved interior surfaces of the members 20 and 21 are disposed, assist in preventing any differential pressure buildup that would cause a wall attachment effect influencing jet fluid entering receivers 25 and 26. Thus the lateral position of the jet is controlled entirely by the differential pressure exerted thereon by the control ports 31 and 32 and this effect occurs for laminar as well as turbulent flow conditions thus extending the operating range of the flowmeter. Furthermore, it gives the fluid amplifier a proportional; i.e., analog operating characteristic, as distinguished from a bistable; i.e., digital characteristic, which is advantageous in extending the operating range of the flowmeter. This proportional amplifier characteristic is illustrated in FIG. 5 which shows the proportional relationship between the differential input pressure $Pc_1 - Pc_2$ applied to the jet through control ports 31 and 32 and the resulting differential output pressure $Po_1 - Po_2$ occuring in receivers 25 and 26, the proportionality factor being a function of the amplifier gain.

Test data on flowmeters of the fluid oscillator type such as the one described above has shown that the following relationship exists between the pressure drop across the flow sensing element and the oscillation frequency.

$$\Delta P = Kf^2 \qquad (1)$$

where $\Delta P$ = pressure drop across sensing element
$f$ = oscillation frequency $K$ = a constant.

Volume through the flowmeter can be defined as:

$$Q = A\, C_D \sqrt{2g/p}\, (\Delta P) \quad (2)$$

where
$Q$ = volumetric flow
$A$ = area of nozzle or orifice
$C_D$ = coefficient of discharge
$g$ = acceleration of gravity
$p$ = density of fluid
$\Delta P$ = pressure drop across sensing element.

Substituting equation (1) in (2) the flow and frequency of the flowmeter are related by the following expression:

$$Q = C_D A \sqrt{2g/p}\, Kf \quad (3)$$

In order to achieve a linear relationship between flow and the fluid oscillator frequency, it can be seen from the above equation (3) that the discharge coefficient $C_D$ must remain constant over the operating range of the flowmeter. In actual practice this is very difficult to achieve because the pressure drop $\Delta P$ is made up of two components which are: (1) the pressure drop due to the conversion of pressure head to velocity head by the fluid accelerating means and (2) the pressure drop due to frictional losses related to flow conditions designated by Reynolds number; i.e., laminar and turbulent flow.

In the flowmeter disclosed in the aforementioned Ringwall application, a nozzle is used as the fluid accelerating means. When operating under the laminar flow conditions particularly in the low end of the range as indicated by Reynolds numbers in the 200 to 400 range the frictional losses become a relatively larger proportion of the pressure drop $\Delta P$ and this shows up as a falloff in the discharge coefficient $C_D$ as shown by the curve A in FIG. 9. This causes nonlinearity in the frequency vs. flow output characteristic which it is desirable to have linear when plotted on a log scale as shown by the curve B in FIG. 8 without use of external compensation means. According to the present invention, a linear output characteristic of the flowmeter without external compensation as well as insensitivity to viscosity changes of the metered fluid is obtained by use of the sharp edge orifice 18 to which detailed reference will now be made.

Figure 6:
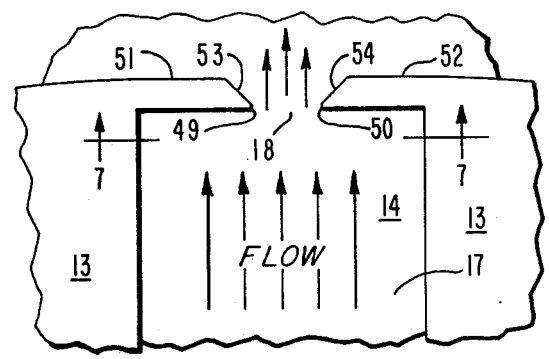
FIG. 6 is an enlarged partial view of the flowmeter of FIG. 1 showing details of the orifice.
Figure 7:
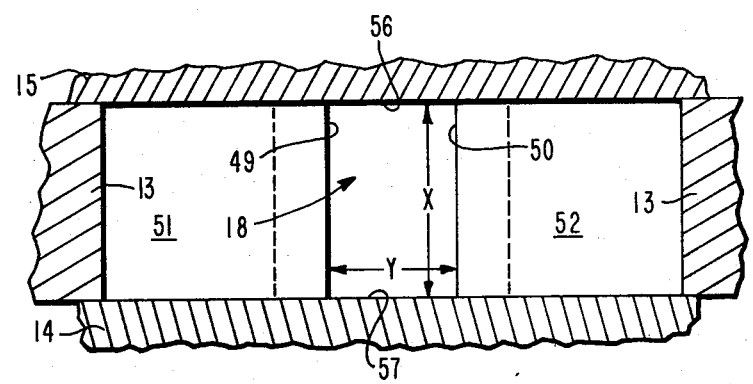
FIG. 7 is a sectional view taken along the section line 5—5 of FIG. 6 looking in the direction of the arrows.

As best shown in FIGS. 6 and 7 of the drawing, the fluid accelerating means of the flowmeter is in the form of a sharp edge orifice 18 extending across the downstream end of the chamber 17. The orifice is non-circular and has, in the form illustrated, a rectangular two dimensional configuration. Two parallel sides of the orifice 49 and 50 having a height designated by dimension X are formed by oppositely disposed projections 51 and 52 on plate 13. These extend inwardly towards the jet axis and have beveled end portions 53 and 54 forming sharp edges spaced apart by the width of the orifice designated by dimension Y. The top and bottom portions 56 and 57 of the orifice are flat being formed by cover 15 and plate 14 which abut the top and bottom portions of projections 51 and 52.

Figure 8:
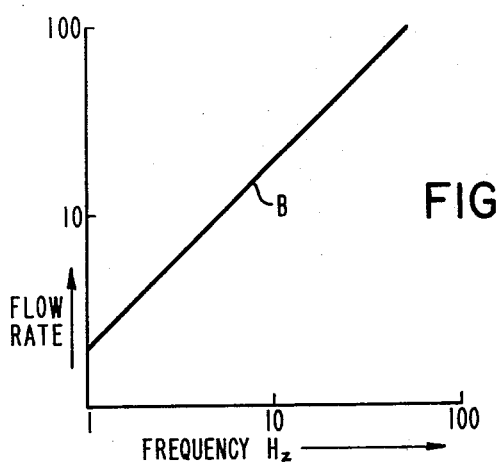
FIG. 8 and FIG. 9 are graphical representations useful in explaining the operating characteristics of the flowmeter.
Figure 9:
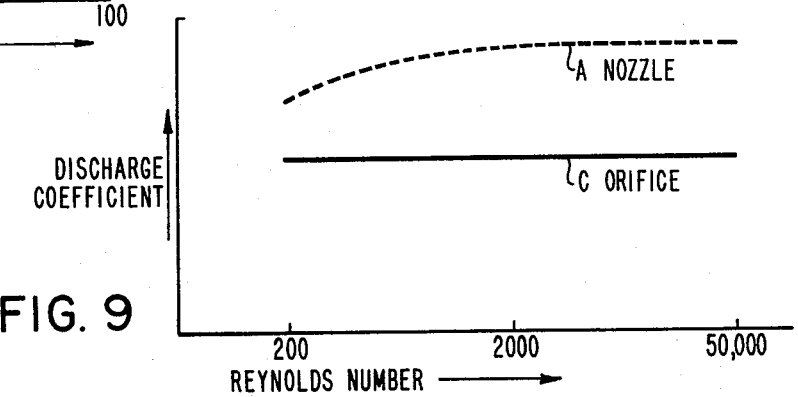

It has been found by experiment that by varying the aspect ratio of the orifice; i.e., the height to width ratio X/Y, the discharge coefficient of the orifice can be adjusted. Further, it was found that if an aspect ratio in the range of 1.5 to 2.0 is selected a discharge coefficient is obtained which remains essentially constant throughout the entire operating range of a flowmeter of the extended range type described above. Furthermore, the discharge coefficient remains constant for laminar and turbulent flow conditions defined by a Reynolds number range of 200 to 50,000. This constant discharge coefficient characteristic is indicated by the curve C of FIG. 9 and represents a substantial improvement when compared with the nozzle curve A. Because the discharge coefficient of the orifice remains constant a linear flow rate vs. frequency output curve such as curve B of FIG. 8 is obtained so that no external compensating means is required for accurate flow indication by meter 48.

Tests made on a flowmeter constructed in accordance with the present invention showed that in tests made with both hydraulic fluid and water the data points for these two fluids fell very close to the same linear output curve B throughout the operating range of the flowmeter including conditions of both turbulent and laminar flow. Since the kinematic viscosity of these two fluids differ by a factor of about 20, the insensitivity of the flowmeter to temperature and resulting viscosity changes of the metered fluid is clearly indicated. Further since the slope of the curve B is 1 as compared with 1.05 when a nozzle is used the improved linearity of the flowmeter over its operating range is also demonstrated.

It will be apparent to those skilled in the art that various changes and modifications may be made without departing from the spirit and scope of the invention. For example, other non-circular polysided orifices may be used wherein two or more pairs of opposite sides have sharp edges and two or more pairs of opposite sides are flat with the ratio of the side dimensions varied to obtain the desired orifice discharge coefficient and the area varied to obtain the desired flow capacity.

What is claimed as new and desired to be secured by Letters Patent of the United States is:

1. A flowmeter of the fluid oscillator type comprising:
    (a) a proportional fluid amplifier having an interaction chamber, fluid accelerating means receiving at least a portion of the fluid, the flow rate of which is to be measured for forming a fluid jet directed into the chamber,
    (b) receiver means disposed on opposite sides of the jet to receive a differentially variable portion of the jet fluid,
    (c) conduit means forming control ports for laterally deflecting the jet with respect to the receiver means,
    (d) feedback conduit means interconnecting the receiver means and control ports of the amplifier to establish the differential pressure to deflect said jet whereby the amplifier is caused to oscillate continuously at a frequency variable in accordance with the flow rate of the fluid passing through the fluid accelerating means,
    (e) flow rate indicating means sensing the jet oscillation frequency,
    (f) said fluid accelerating means being in the form of a sharp-edged orifice having an aspect ratio which provides a predetermined constant orifice discharge coefficient whereby the flow vs. frequency characteristic of said flowmeter is linear for Reynold's numbers in the range from 200 to 50,000.

2. The flowmeter of claim 1 wherein the orifice has a non-circular configuration.

3. The flowmeter of claim 1 wherein the orifice has a configuration comprising at least two pairs of parallel sides with sharp edges on two of the parallel sides.

4. The flowmeter of claim 1 wherein the orifice has a rectangular configuration with sharp edges on two sides.

5. In a flowmeter of the proportional type of fluid oscillator type having,
   (a) fluid accelerating means in the flow stream being measured for producing a jet,
   (b) negative fluid feedback means to cause said jet to oscillate,
   (c) control ports adjacent to the orifice fluid accelerating means,
   (d) means coupling the fluid feedback means to said ports,
   (e) the arrangement wherein the fluid accelerating means is a two-dimension, non-converging orifice in the flow stream having two opposite parallel sides provided with sharp edges.

6. The flowmeter of claim 5 wherein the orifice sides between the orifice sides with sharp edges have flat sides.

7. The flowmeter of claim 6 wherein the ratio of the length of the orifice sides with sharp edges to length of the orifice sides which are flat provides a constant coefficient of discharge from said orifice for various flow conditions in both the turbulent and laminar flow range.

8. The flowmeter of claim 6 wherein the aspect ratio of the orifice is in the range of 1.5 to 2.0.

* * * * *